(12) United States Patent
Watanabe

(10) Patent No.: US 6,881,961 B2
(45) Date of Patent: Apr. 19, 2005

(54) CONTROL OF TEMPERATURE OF FLAT PANEL TYPE OF RADIATION DETECTOR

(75) Inventor: Naoto Watanabe, Tochigi-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 56 days.

(21) Appl. No.: 10/183,440

(22) Filed: Jun. 28, 2002

(65) Prior Publication Data

US 2003/0010925 A1 Jan. 16, 2003

(30) Foreign Application Priority Data

Jun. 29, 2001 (JP) .................................... P2001-197648

(51) Int. Cl.[7] .............................................. G01T 1/24
(52) U.S. Cl. ............................................ 250/370.15
(58) Field of Search .................................. 250/370.15

(56) References Cited

U.S. PATENT DOCUMENTS 5,859,680 A * 1/1999 Jungbauer et al. ............ 349/72
6,469,312 B1 * 10/2002 Agano .................... 250/370.09
2002/0005490 A1 * 1/2002 Watanabe .............. 250/370.09

* cited by examiner

*Primary Examiner*—Constantine Hannaher
(74) *Attorney, Agent, or Firm*—Oblon, Spivak, McClelland, Maier & Neustadt, P.C.

(57) ABSTRACT

A radiation detector is realized as, for example, a flat panel detector (FPD) for two-dimensionally detecting X-rays. The detector comprises a detection board and a control unit. The detection board on which a plurality of detection elements for detecting a radiation are two-dimensionally disposed in a matrix and circuits for collecting signals from the detection elements. The control unit for controlling the detection board so that the detection board is placed in a predetermined temperature state. The predetermined temperature state is defined, for example, as predetermined ranges of temperatures used during the operation and the non-operation states of the detector, respectively. This radiation detector can be mounted in a radiography system such as an X-ray radiography system.

15 Claims, 10 Drawing Sheets

CONTROL OF TEMPERATURE OF FLAT PANEL TYPE OF RADIATION DETECTOR

BACKGROUND

1. Technical Field of the Invention

The present invention relates to a radiation detector, called a flat panel detector (FPD), and a radiography system with the radiation detector for medical or industrial applications.

2. Description of Related Art

A radiography system, such as a medical X-ray radiography system, requires a radiation detector. As one conventional radiation detector for acquiring radiographic fluoroscopy images of an object, there has been used a unit in which an image intensifier (referred to as an "I.I.") is placed in a combination with an imaging tube or solid imaging element (such as a "Charge Coupled Device (CCD)"). This unit converts information about X-rays that have been transmitted through the object into optical signals. The optical signals are then sent to a TV camera to display them as images on a monitor or printed images on films.

However, for the above unit in which the image intensifier is combined with the imaging tube or CCD, it is fairly difficult to meet a strong demand that finer abnormalities or lesions of an object should be detected. To meet such a demand, a flat panel detector (FPD) with use of sophisticated semiconductor techniques has been developed. The FPD is a semiconductor array in which an optical-conductive layer to convert radiations into electric charges are placed over switching elements, capacitors, or others formed on for example a glass substrate. The FPD, which is relatively lighter in weight and more compact in size, has the advantage of being able to provide higher-resolution and less-distortion images.

The FPD is categorized into a direct conversion type of FPD and an indirect conversion type of FPD. The former is a device to directly convert radiations into electrical signals, while the latter is a device to convert radiations into optical signals temporarily and then to convert their optical signals into electrical signals. In the following, the direct type of FPD will be explained.

The FPD is formed into a structure in which pluralities of detection elements are two-dimensionally mapped, each of which elements converts a radiation into electric charges and stores the charges. Compared to the unit based on both of the image intensifier and the TV camera, the FPD is advantageous in various aspects. For example, the FPD is able to provide higher-resolution and less-distortion images. In addition, because the FPD outputs digital-amount signals indicative of information about a radiographic image, the image processing is easier. As being formed into a greatly thinned and light shape, the FPD can be attached to a radiography system in an easier manner. Further, the FPD is able to give a widened range of operations to a radiography system and contribute a compact and light configuration of the radiography system. When using a radiography system with the FPD as a medical imaging modality, the system gives less stress to patients, because it is formed into a light and compact appearance.

However, the FPD includes a large number of active elements made of semiconductor materials in its semiconductor array, and generates heat during the operation. Due to the generated heat, the temperature given to components (for example, the conversion membrane) influencing characteristics, such as detection sensitivity of radiations, is also changed. As a result, there is a possibility that it is difficult for the FPD to detect signals of stable images, though such stable images may be detected if no heat is generated. When the temperature of the FPD is not controlled with higher accuracy during its operation, the detection characteristic is deteriorated. Such deterioration, if occurring practically, may not lead to detection of an effectively examined image. That is, in cases where the FPD is employed by a medical imaging modality, it is no longer easy to provide clinically useful images.

For instance, it is frequent that, while fluoroscopic imaging is conducted by a cardiovascular X-ray imaging modality with such FPD, a doctor operates a catheter to inject it into a patient. In cases where the detection characteristic of the FPD begins to deteriorate during the doctor's operations of the catheter, fluoroscopic images cannot be provided any longer or only obscure images are provided. In any case, the operations to the catheter are obliged to encounter very difficult situations.

On the other hand, if the radiography system is located at a site in a lower-temperature environment, it may suffer from a lower-temperature atmosphere during its non-operation. In such a lower temperature condition, there is a possibility that the FPD is damaged. To avoid this inconvenience requires that the system be heated so as to keep its minimum temperature. Such heating means is required to work only during the rest of the system.

The FPD is structured such that the conversion membrane is deposited on the TFT array for conversion of the radiations into electric charges, in which electric charges stored at each pixel correspondingly to radiated radiations are read out by switching the TFT array. In addition, there is a difference in thermal expansion coefficient between the TFT array and the conversion membrane. If the temperature is lower, there is a fear that the conversion membrane is peeled off so that the image acquisition is stopped completely. It has also been known that if the FPD is left for a long time in a higher-temperature environment, the re-crystallization is caused in the FPD so that its service life is shortened. Thus, depending on where the radiography system is placed, some cases requires the system to be cooled dawn during its non-operation, as well as its heating.

As described, a region of temperatures for stabilizing the detection characteristics of the FPD during its operation is different from that required for avoiding the FPD during its non-operation from being damaged or shortened in its service life. Controlling both temperature regions of the FPD by the same control means will lead to excessive control actions. For example, as to environmental temperatures, the range of 10 to 35° C. is required during the operation of the FPD, while that of 10 to 60° C. is required during the non-operation of the FPD. In such a case, if a target temperature is 30° C., there are no problems about the temperature control during its operation. However, there is a fear that condensation may be caused during its non-operation, because there is a large difference between the environmental temperatures and the target temperature. The condensation may trigger a short circuit or electric shocks.

SUMMARY OF THE INVENTION

The present invention has been performed in consideration of the foregoing drawbacks. An object of the present invention is to provide a radiation detector and a radiography system with the radiation detector, which have the capability of not only controlling the temperature of the detector with precision during its operation, thus securing a steady detection characteristic of the detector, but also controlling the temperature of the detector during its non-operation, thus preventing the detecting from suffering condensation and being damaged.

In order to achieve the above object, as one aspect of the present invention, there is provided a radiation detector comprising; a detection board on which a plurality of detection elements for detecting a radiation are two-dimensionally disposed in a matrix and circuits for collecting signals from the detection elements; and a control unit for controlling the detection board so that the detection board is placed in a predetermined temperature state.

Preferably, the predetermined temperature state is defied as a predetermined range of temperatures. Still preferably, the predetermined range of temperatures is a range defined by either an upper temperature limit or a lower temperature limit.

It is also preferred that the control unit includes a sensor for sensing a temperature of the detection board; a cooling/heating member for selectively cooling/heating the detection board; and a controller for controlling the temperature of the detection board based on the temperature sensed by the sensor and information indicative of the predetermined temperature state.

In order to achieve the above object, as one aspect of the present invention, there is provided a radiography system comprising: a radiation detector having, a detection board on which a plurality of detection elements for detecting a radiation are two-dimensionally disposed in a matrix and circuits for collecting signals from the detection elements, and a control unit for controlling the detection board so that the detection board is placed in a predetermined temperature state; and a specification unit for specifying information indicative of the predetermined temperature state.

DETAILED DESCRIPTION OF PREFERRED EMBODIMENTS

With reference to the accompanying drawings, embodiments of the present invention will now be described in detail.

Referring to FIGS. 1 to 10, an embodiment of the present invention will now be described. In the present embodiment, a radiation detector according to the present embodiment and a radiography system with the radiation detector will be explained. As the radiography system, a medical X-ray radiography system will be reduced into practice.

Figure 1:
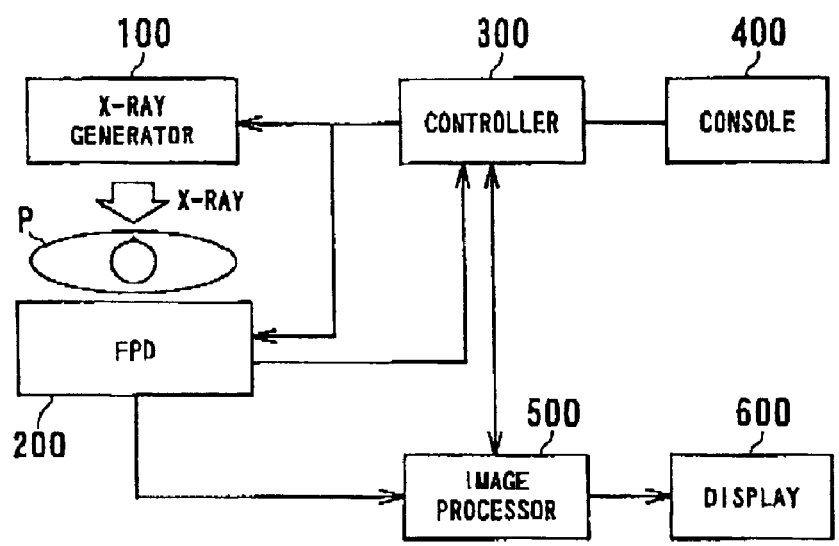
FIG. 1 is a block diagram showing an outlined configuration of one embodiment of a medical X-ray radiography system according to the present invention.

FIG. 1 shows an outlined configuration of a medical X-ray radiography system according to the present invention.

The X-ray radiography system has an X-ray generator 100 and a flat panel detector (FPD) 200 for detecting X-rays, which are placed to be opposed to each other with an object P therebetween. The X-ray radiography system is further provided with a controller 300, a console 400, an image processor 500, and a display 600. Of these, the controller 300 includes a computer and memories for entirely controlling the X-ray radiography system. The console 400 allows an operator to perform necessary operations toward the controller 300. The image processor 500 is placed to give various types of processing such as gradation processing to digital image signals obtained from the FPD 200. The display 600 is responsible for visualizing output signals from the image processor 500 as images.

Figure 2:
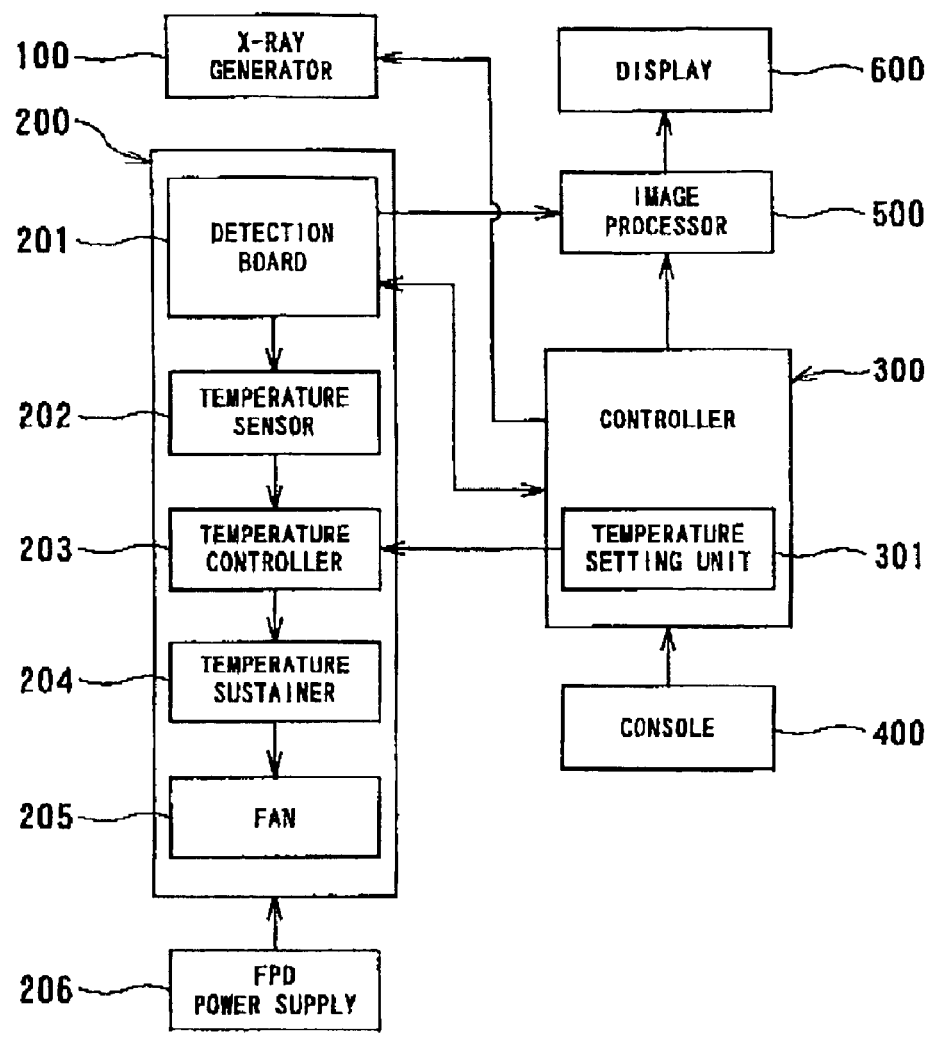
FIG. 2 is an electric block diagram outlining the medial X-ray radiography.

As shown in FIG. 2, the FPD 200 has a detection board 201, temperature sensor 202, temperature controller 203, temperature sustainer 204, fan 205, and FPD power supply 206.

Figure 3:
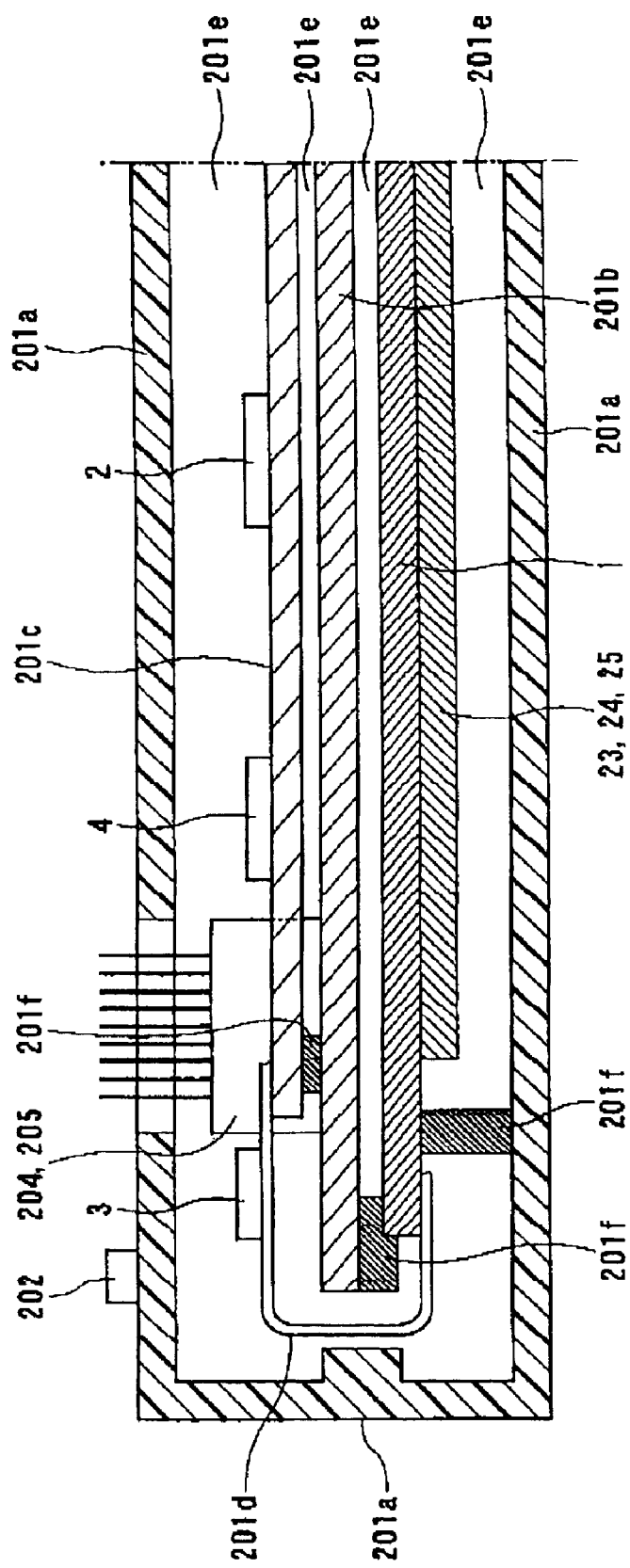
FIG. 3 pictorially shows a cross section of one embodiment of a radiation detector incorporated in the medial X-ray radiography system, the detector being formed according to the present invention.

As shown in FIG. 3, the detection board 201 contains matrix-arrayed pixels 1, a gate line drive circuit 2, a signal readout circuit 3, and a timing control circuit 4. Before entering the explanation of the structure of the detection board 201, the constituents 1 to 4 will be outlined with reference to FIGS. 4 to 7.

Figure 4:
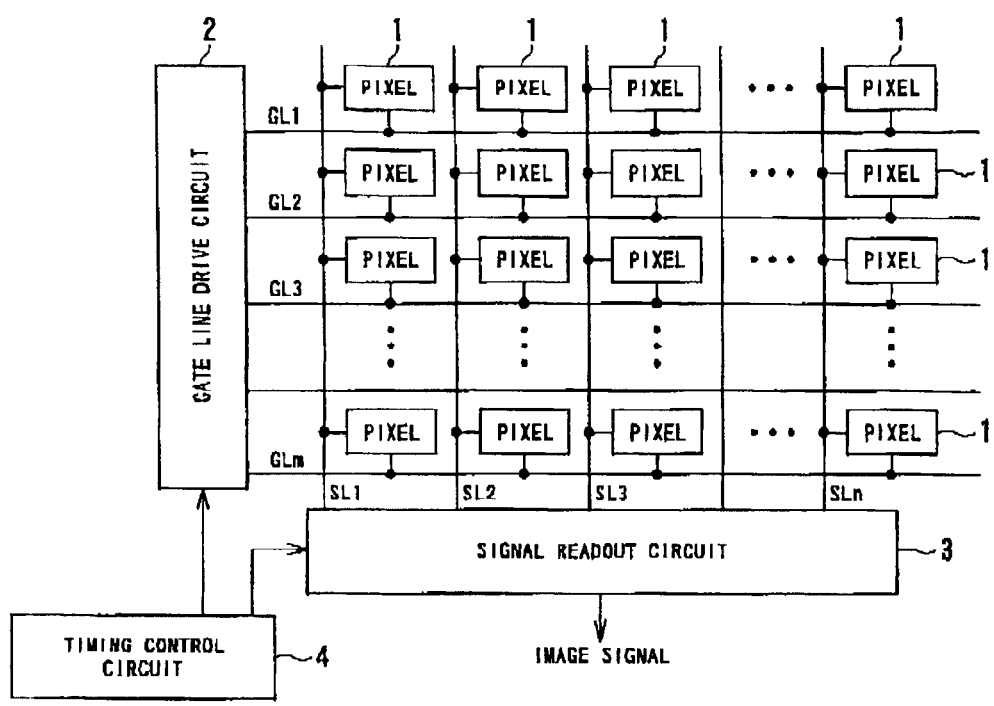
FIG. 4 outlines the configuration of a flat panel detector to which the present invention is applied.

FIG. 4 exemplifies an outlined configuration of the direct type of FPD 200. The FPD 200 has a multitude of pixels 1 on which a conversion membrane (later described) to convert radiations into electric charges is layered. The conversion membrane is made of, for example, selenium (Se). The pixels 1 are mapped in a matrix, thus forming one frame of image. Each pixel 1 contains, as will be described later, a capacitor to store electric charges converted from radiations that have income and a switching element to pick up, as a detection signal, the stored electric charges in the capacitor. Electrodes of each pixel 1 are connected through its switching element to both of gate lines $GL_j$ (j=1 to m; m is an integer larger than 1) and signal lines $SL_i$ (i=1 to n; n is an integer larger than 1). Each gate line $GL_j$ is connected to the gate line drive circuit 2, whilst each signal $SL_i$ is connected to the signal readout circuit 3. Both the gate line drive circuit 2 and the signal readout circuit 3 are controlled by the timing control circuit 4.

The gate lines $GL_j$ correspond to the rasters in television scanning. When the gate line drive circuit 2 supplies a drive signal to a specified gate line $GL_j$, all the pixels 1 connected to the specified gate line $GL_j$ to which the drive signal is supplied are excited to be ready for their on-states. The gate line drive circuit 2 is able to send out drive signals in turn at predetermined intervals to all the gate lines $GL_j$ for one frame of image so that the gate lines $GL1, GL2, \ldots, GLm$ are scanned in sequence. Alternatively, as non-interlacing scanning, the gate line drive circuit 2 may drive first odd-number-th gate lines GL1, GL3, . . . , GLm−1 in sequence, and then even-number-th gate lines GL2, GL4, . . . , GLm in sequence.

Figure 5:
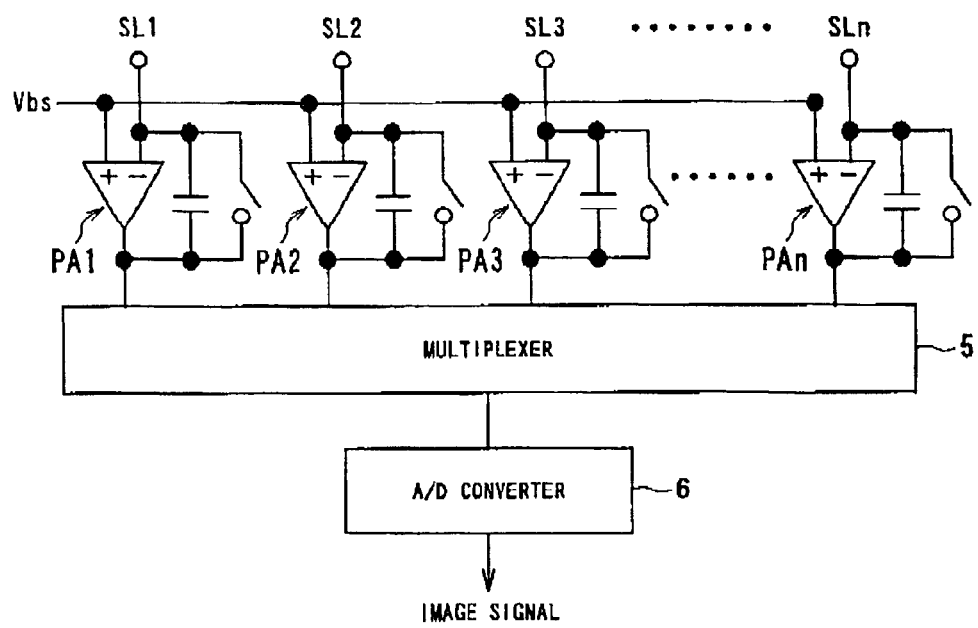
FIG. 5 is a diagram showing a signal readout circuit used in the flat panel detector.

The signal readout circuit 3 is configured, for example, as shown in FIG. 5. Correspondingly to each signal line SLi, the circuit 3 has pre-amplifiers PA1 to PAn in charge of voltage conversion and amplification of each inputted signal, a multiplexer 5 to switch on/off in turn the outputs from the pre-amplifiers PA1 to PAn, and an A/D converter 6 to convert an analog signal outputted from the multiplexer 5 into digital amounts of signal. The signals from the signal lines SLi compose image signals.

Figure 6:
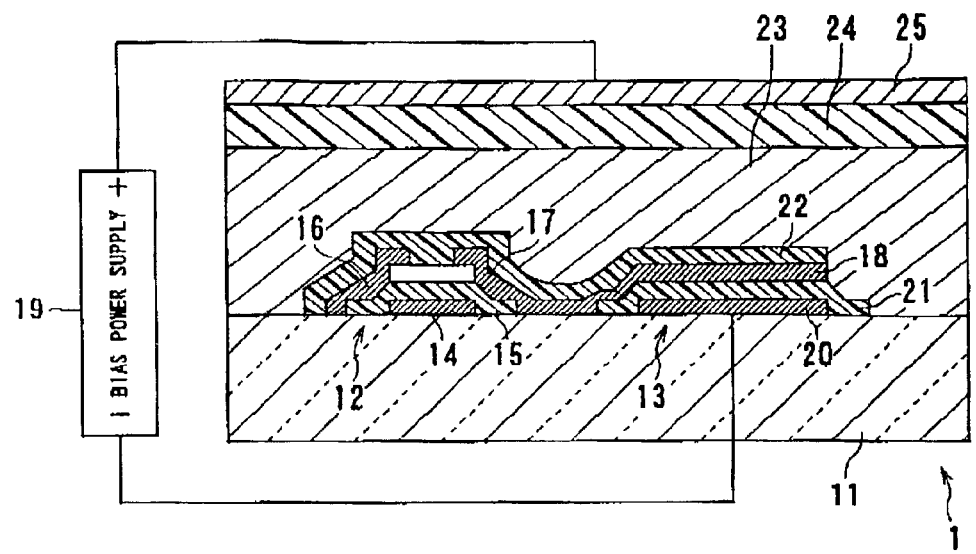
FIG. 6 pictorially depicts a cross section of each pixel structure of the flat panel detector.
Figure 7:
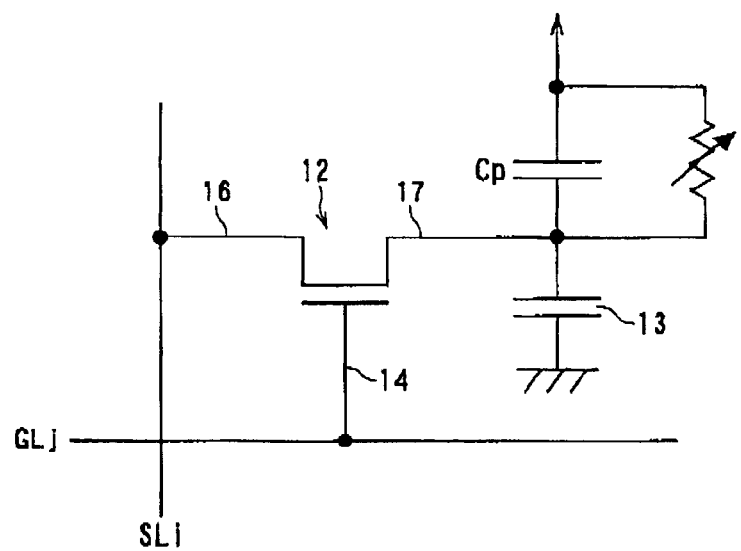
FIG. 7 is an electric equivalent circuit of each pixel that composes the flat panel detector.

FIG. 6 pictorially illustrates a section of each pixel 1 contained in the FPD and FIG. 7 shows an equivalent circuit to each pixel 1. With reference to these figures, each pixel 1 will now be explained.

Each pixel 1 is formed with various elements, such as a thin film transistor (TFT) 12 serving as a switching element formed on a glass substrate 11, a storage capacitor 13, and others. The TFT 12 is composed of a gate electrode 14, a gate insulation layer 15 formed on and over the gate electrode 14, and both of a source electrode 16 and a drain electrode 17 formed on the gate insulation layer 15. The gate electrode 14 is connected to a specified one gate line GLj, the source electrode 16 is connected to a specified one gate signal line SLi, and the drain electrode 17 is connected to a pixel electrode 18.

The storage capacitor 13 includes a lower common electrode 20 connected with a negative terminal of a bias power source and is structured such that the common electrode 20 faces the pixel electrode 18 via an insulation layer 21. In addition, a charge-preventing layer 22 is formed on the source, drain and pixel electrodes 16, 17 and 18. On both of the TFT 12 and the storage capacitor 13, there are formed a conversion membrane 23 to convert radiations into electric charges, a dielectric layer 24, and an upper common electrode 25 connected to a positive terminal of the bias power source 19 in turn in this order, thus composing a pixel capacitor Cp. The conversion membrane 23 is made of semiconductor materials that have a higher efficiency of converting radiations into electric charges. Such materials include amorphous selenium (a-Se) formed into a thickness of 500 to 1000 μm by making use of a vacuum deposit technique. This membrane 23 made of a semiconductor material is often called an optical conductive membrane as well.

The operations of this detection board 201 will now be described. Radiations that have come into the conversion membrane 23 are absorbed therein, and are converted into electric charges depending on an amount of the radiations. The membrane 23 is connected electrically in series to the storage capacitor 13 so that a capacitor is formed. Thus, the bias power supply 19 applies a bias voltage between the upper and lower electrodes 25 and 20, electric charges (electrons and holes) that have been generated move toward mutually opposite-polarity electrodes, thereby loading the storage capacitor 13 with a predetermined type of electric charges. In this way, pixel by pixel, radiations that have been transmitted through an object are converted into electric charges and stored. Reading the stored electric charges as an image signal makes it possible to produce an image based on the radiations.

The image signals are read as follows. The electric charges accumulated by each storage capacitor 13 can be read out through a certain signal line SLi by providing a specified gate line GLj with a voltage that is enough for turning the TFT into its on-state. Accordingly, as shown in FIG. 4, the gate line drive circuit 2 is activated to provide a drive voltage to the gate lines GLj sequentially or every one line, thus making it possible to read each image signal from all the pixels 1. The signal read out from each pixel 1 is sent through each signal line SLi to the signal readout circuit 3, in which the signal is subjected to voltage conversions, amplification, A/D conversions and others so as to produce a digital image signal indicative of information about part of a radiation image.

Returning to FIG. 3, the temperature sensor 202 is placed to detect the temperature of the detection board 201. The temperature controller 203 is responsible for controlling the temperature of the detection board 201 into a desired temperature in reply to a detected temperature by the temperature sensor 202. Under this control, the temperature sustainer 204 operates to cool off or heat up the detection board 201 with the help of the circulation of heated or cooled wind. The fan 205 is placed to forcibly perform such circulation and accelerates the effects of the cooling or heating operation.

As can be seen in FIG. 3, the detection board 201 is also equipped with a casing 201a made of for example aluminum, within which there is a partition plate 201b. Over one surface of the partition plate 201b, arranged is the structure of the matrix-arrayed pixels 1 covered by the conversion membrane 23 to convert radiations into electric charges. On the other hand, over the other surface of the partition plate 201b, there is a substrate 201c on which the gate line drive circuit 2, signal readout circuit 3, timing control circuit 4 and others are arranged. The structure of the pixels 1 is electrically connected to the substrate 201c through a TAB (Tape Automatic Bonding) 201d. In addition, a surface side of the casing 201a, which faces the conversion membrane 23, that is, an incidence side of the X-rays, is formed by a plate made of CFR (Carbon Fiber Reinforced Plastic) whose X-ray absorption rate is lower.

The signal readout circuit 3 mounted on the substrate 201c has, as described before, the active elements such as the pre-amplifiers PA, multiplexer 5, and A/D converters 6, so that the circuit 3 becomes a large heating source during the operation of the detector 200. Such constituents as the pixels and the conversion membrane 23 are sensitive to temperatures, such as being apt to be unstable, so that the detection characteristics of radiations are significantly affected. To relieve the direct influence of the heat from the heating source to the pixels, spacers 201f are placed to form layer-like air spaces 201e between the partition plate 201b and the pixels 1 and between the partition plate 201b and the substrate 201c, respectively. Other layer-like air spaces 201e are also formed on the opposite side of the partition plate 201b, so that the air is smoothly circulated around the pixels 1, conversion membrane 23, and substrate 201c within the casing 201a.

The temperature sensor 202 is attached on the surface of the casing 201a or is embedded within the pixels 1 covered by the conversion membrane 23 that senses directly the heat. In this embodiment, as shown in FIG. 3, the temperature sensor 202 is mounted on the outer surface of the casing 201a, which is opposite to the X-ray incidence surface. The temperature sensor 202 to be mounted may be one or plural in number. If the plural temperature sensors 202 are mounted, a maximum temperature and a minimum temperature can be detected or an average value of the temperatures can be computed.

The temperature sustainer 204 is also mounted on the casing 201a or in an inner space enclosed by the casing

201a. In the present embodiment, as shown in FIG. 3, the temperature sustainer 204 is mounted on the surface of the partition plate 201b, which is opposite to the X-ray incidence surface, within the casing 201a. The fan 205 is combined and united with the temperature sustainer 204.

The signal indicative of a signal indicative of temperature detected by the temperature sensor 202 is sent to the temperature controller 203. To the temperature controller 203, information indicative of a target temperature designated at a temperature setting unit 301 later described is inputted. Hence the temperature controller 203 uses the target temperature and a temperature detected by the temperature sensor 202 so as to control the operations of the temperature sustainer 204. As to the target temperature, specified is a target range of temperatures having an upper limit and a lower limit. In cases where the temperature controller 203 finds that an actual temperature detected by the temperature sensor 202 is over the upper limit of the target temperature range, the controller 203 urges the temperature sustainer 204 to start its cooling operation. In contrast, when the temperature controller 203 finds that an actual temperature is below the lower limit of the target temperature range, the controller 203 urges the temperature sustainer 204 to start its heating operation. If the temperature detected by the temperature sensor 202 is between the upper and lower limits, the controller 203 causes the temperature sustainer 204 to halt its cooling or heating operation.

Figure 8:
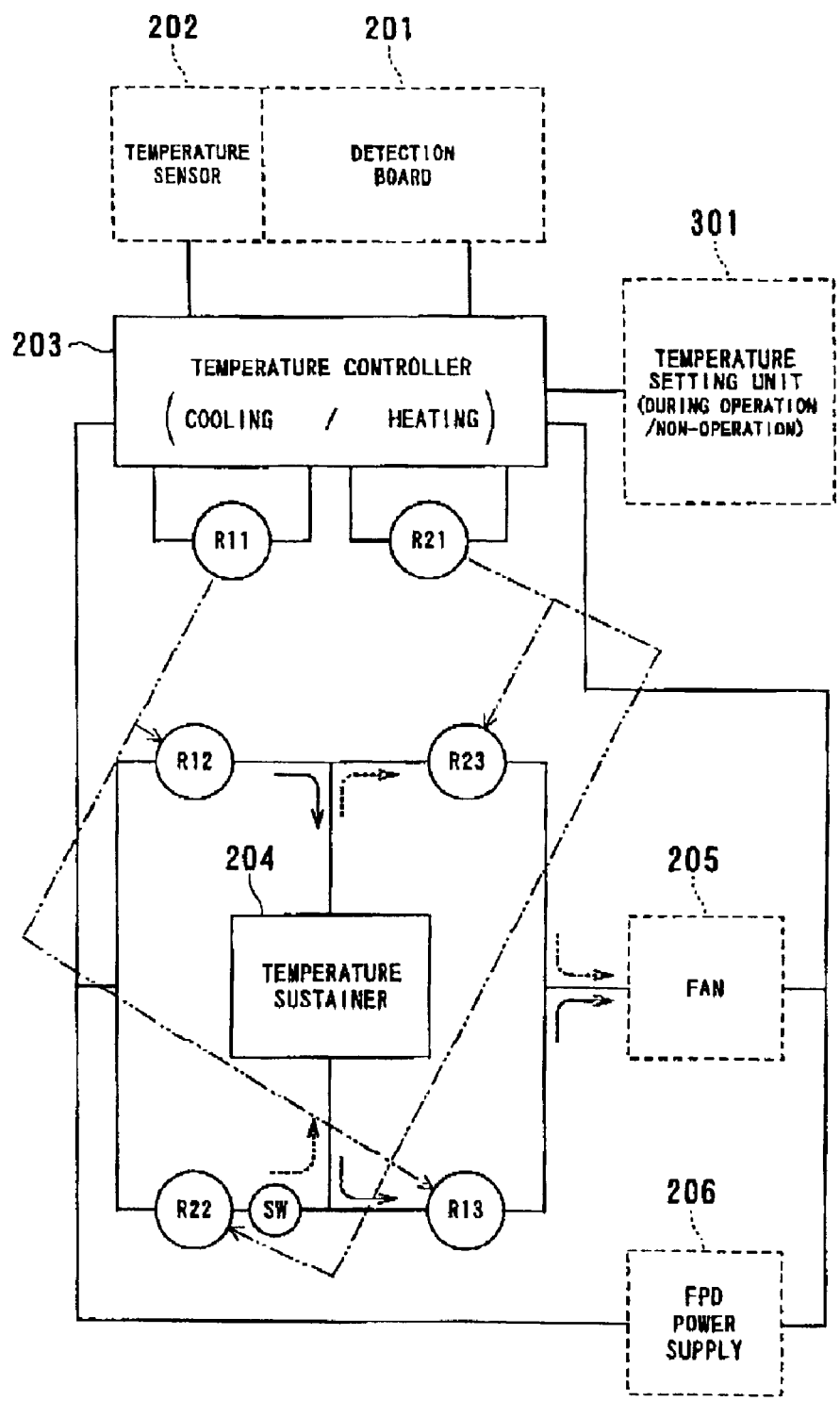
FIG. 8 is a circuit diagram representing in block forms a temperature control part of the radiation detector.

The temperature controller 203 and temperature sustainer 204, which operate as described above, are incorporated in a circuit as shown in FIG. 8.

The temperature controller 203 includes a series of switches R11, R12 and R13 in charge of the cooling operation and a further series of switches R21, R22 and R23 in charge of the heating operation. Of these switches, the four switches R12, R13, R22 and R23 are mutually connected to form a bridge type of circuit. In this circuit, the temperature sustainer 204 is connected to both of a central point between the two switches R12 and R23 and a further central point between the two switches R22 and R13. The temperature sustainer 204 is provided with a Peltier element that is able to reversibly perform the cooling or heating operation responsively to the directions of a current to flow through the Peltier element. One common terminal of the bridge type of circuit is connected to a negative terminal of the FPD power supply 206, while the other common terminal thereof is connected to a positive terminal of the FPD power supply 206 via the fan 205.

In the temperature controller 203, a temperature detected by the temperature sensor 202 is compared with the upper and lower limits of a target temperature range set at the temperature setting unit 301. If a detected temperature falls into a range between the upper and lower limits, all the switches R11 to R13 and R21 to R23 are turned off or kept to their turn-off states. During the repetition of the above detection and comparison, as long as a detected temperature exceeds the upper limit, the temperature controller 203 performs the cooling operation by turning on the cooling switch R11. The turn-on of the cooling switch R11 forces the other two switches R12 and R13 to turn on as well in an associated manner. Accordingly, current flows through the temperature sustainer 204 connected to the bridge type of circuit, as shown by solid lines in FIG. 8. Responsively to the current flow, the Peltier element in the temperature sustainer 204 provides the cooling action and the fan 205 is driven as well. The cooling operation is continued until a detected temperature of the temperature sensor 202 becomes below the upper limit. When such a reduction in the temperature is detected, the switch R11 is turned off, with the result that the remaining two switches R12 and R13 are turned off responsively to stop the cooling operation.

On the other hand, when a detected temperature falls below the lower limit, the temperature controller 203 performs the heating operation by turning on the heating switch R21. The turn-on of the cooling switch R21 forces the other two switches R22 and R23 to turn on as well in an associated manner. Accordingly, current flows through the temperature sustainer 204 of the bridge type of circuit, as shown by dotted lines in FIG. 8, that is, in the opposite direction to that in the above cooling operation. Responsively to the current flow, the Peltier element in the temperature sustainer 204 provides the heating operation and the fan 205 is driven as well. The heating operation is continued until a detected temperature of the temperature sensor 202 becomes over the lower limit. When such an increase in the temperature is detected, the switch R21 is turned off, with the result that the remaining two switches R22 and R23 are turned off responsively to stop the heating operation.

The fan 205 is placed to accelerate the cooling and heating operations of the Peltier element by blowing the wind toward a radiator fin of the Peltier element. Thus, the fan 205 is connected to the bridge type of circuit so that it works only when the temperature sustainer 204 is engaged in the cooling or heating operation.

In the present embodiment, as one characteristic thereof, the temperature sustainer 204 is configured to work based on two or more target temperatures or target temperature ranges at which or during which the temperature of the FPD is kept. In order to realize this, the temperature setting unit 301 allows operations for such setting.

Specifically, in cases where the X-ray radiography system is in operation, that is, the system is put on to acquire image signals, it is required that the detection board 201 should be maintained at a predetermined temperature to secure a higher detection sensitivity for radiations. If the detection body 201 is maintained at a temperature of T1 during such operation, the target value during the operation is set at a temperature of T1 at the temperature setting unit 301.

On the other hand, in the case that the detection board 201 is not under operation, i.e., the X-ray radiography system is not used for imaging, it is not required to maintain the detection board 201 at the temperature T1, because there is no need to acquire image signals. At the same time, since the detection board 201 is not powered, no problem about the heat generation will have occurred. Accordingly, the detection board 201 depends on only the surrounding temperature.

However, if the FPD body 201 is exposed to a lower-temperature atmosphere when the X-ray radiography system is not in operation, there is a possibility that a serious damage occurs. To be specific, the conversion membrane 23 deposited on the pixels 1 might be peeled off, because of differences in thermal expansion rates between the conversion membrane 23 and the pixels. By contrast, it is pointed out that, when the detection board 201 has been left in a higher-temperature atmosphere for a long time, the detection board 201 may be subjected to its re-crystallization to thereby shorten its service life. This means that, even if the X-ray radiography system is in non-operation, the detection board 201 should be maintained within a predetermine range of temperatures. Such a temperature range is set to a range from a lower limit of T2 to an upper limit of T3.

The entire operation of the X-ray radiographic system will now be outlined as follows.

X-rays that have been radiated from the X-ray generator 100 transmit the object P to impinge into the FPD 200, where the X-rays are converted into a two-dimensional distribution of electric charges depending on amounts of the incoming X-rays into the FPD 200. The two-dimensional distribution of electric charges in the FPD 200 is read out as digital image signals in sequence, every gate line GLj, through the signal lines SLi and the signal readout circuit 3, in response to the drive signals issued from the gate line drive circuit 2. The readout signals are then subjected to various types of processing including gradation processing in the image processor 500, and then sent to the display for display of an X-ray fluoroscopic image.

Figure 9A:
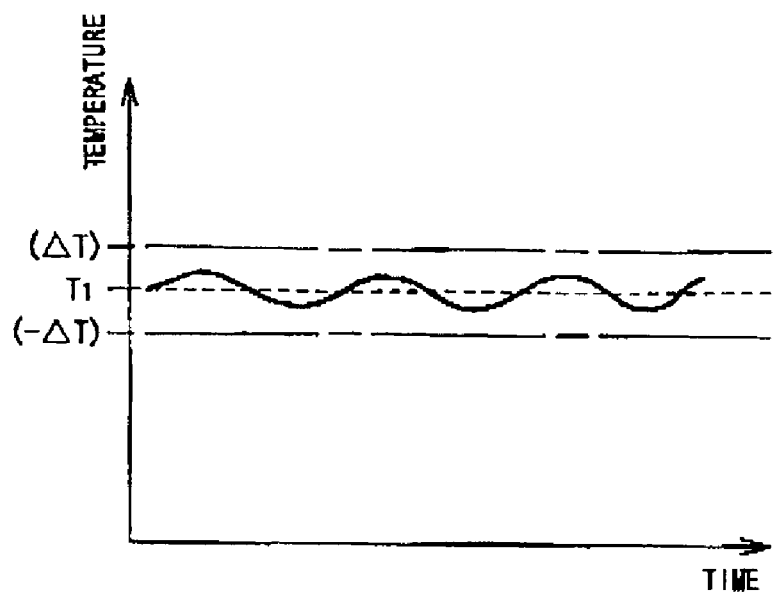
FIGS. 9A and 9B are illustrations each exemplifying temperature control for the radiation detector.
Figure 9B:
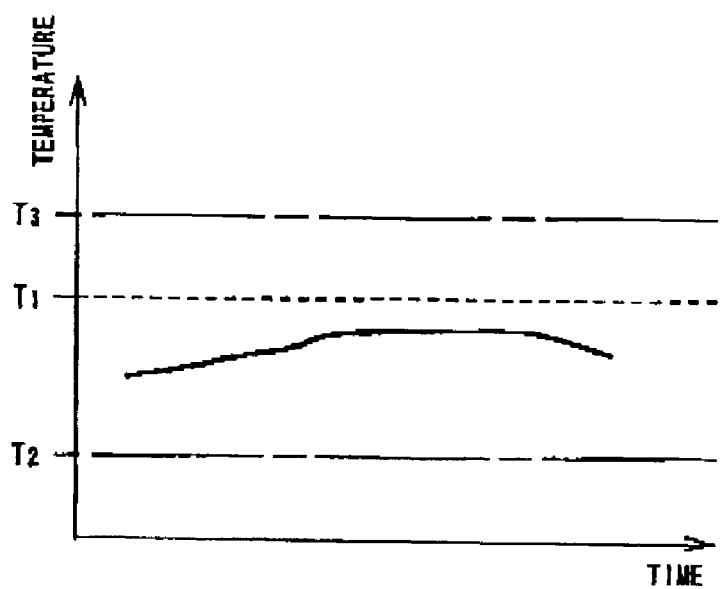

FIGS. 9A and 9B show examples of the temperature control under which the detection board 201 is maintained at predetermined temperature states. FIG. 5A is an example obtained when the X-ray radiography system is in operation and FIG. 5B is another example obtained when the X-ray radiography system is in non-operation (not operated for imaging).

By way of example, when the system is in operation, a target temperature of T1=30° C. is set in the temperature setting unit 301, the control is performed depending on a temperature detected by the temperature sensor 202. When a detected temperature exceeds the target temperature of 30° C., the temperature controller 203 causes the temperature sustainer 204 to start the cooling operation. In contrast, when a detected temperature is below the target temperature 30° C., the temperature controller 203 causes the temperature sustainer 204 to start the heating operation. As shown in FIG. 9A, repeating the cooling and heating operations permits the temperature of the detection board 201 to be maintained at the target temperature T1=30° C.±ΔT, as shown in FIG. 5A. ±ΔT are tolerances for control, which are decided by imaging conditions, such as a desired image quality. Normally, the tolerances of ±ΔT are set to an amount of a few percentage of the target temperature T1. Therefore, a higher detection sensitivity for radiations, which is best required during the operation of the system, can be maintained.

In contrast, in cases where the X-ray radiography system is not in operation, a target range of temperature is given, through the temperature setting unit 301, for example by specifying the lower limit T2 as 10° C. as well as by specifying the upper limit T3 as 40° C. In reply to this temperature range, if the temperature controller 203 determines that a detected temperature by the temperature sensor 202 is over the upper limit of 40° C., the temperature sustainer 204 initiates the cooling operation. But when a detected temperature is below the lower limit of 10° C., the temperature sustainer 204 starts the heating operation. As shown in FIG. 9B, as long as a detected temperature is kept to be 10° C. or more but 40° C. or less, neither heating nor cooling operation is conducted. In this way, since the detection board 201 is maintained within a predetermined temperature range having both of a lower limit and an upper limit, the detection board 201 can be prevented from being damaged, thereby prolonging its service life. Consumed energy is also saved.

The temperature range employed in the above non-operation state has been exemplified such that the detection board 201 is sustained in temperature within a range from 10 to 40° C. It can therefore be assumed that the temperature is kept at 40° C. or approximately 40° C. (but below 40° C.). In this condition, the X-ray radiography system is put in operation, the temperature sustainer 204 operates through its cooling operation so as to forcibly lower the temperature down to the target temperature of 30° C., by about 10° C. If this cooling is done so quickly, there is a fear that there occurs condensation inside and outside the detection board 201. This condensation may lead to short circuits and electric shocks. To solve this problem, it is preferred that the upper limit of a target temperature range for the non-operation state of the system is the same or lower as or than a target temperature for the operation state thereof. Such way of setting the same or lower temperature enables the temperature sustainer 204 to launch its operation from the heating operation at any time when the X-ray radiography system that has been in non-operation is set into operation. Accordingly, no problems of the condensation will occur, thus avoiding the foregoing short-circuits and electric shocks.

In addition, if failures or some other accidents occur in the control system during the heating operation carried out by the temperature sustainer 204, there is a possibility that the temperature control is out of control so that only the heating operation is continued. If this actually happens, the temperature of the detection board 201 may continue rising, resulting in unwanted conditions. In order to avoid such an unfavorable situation, a temperature switch SW for emergency use is connected in series to, for example, the switch R22 in the circuit for the temperature controller 203, as shown in FIG. 8. This emergency-use temperature switch SW is composed of, for example, a bimetal, and operates such that it turns off when the temperature reaches a certain temperature (for example, 50° C.) determined above the target temperature. Thus, shutting off the current through the temperature sustainer 204 halts the forcible heating operation.

As an alternative, such a temperature switch can be connected in series to for example the switch R12 and formed such that it turns off when the temperature is reduced down to a certain low temperature (for example, 0° C.). This way of inserting the temperature switch can cope with failures in the control system of the temperature sustainer 204 during its cooling operation.

Next, the X-ray radiography system comprising the FPD 200 will now be explained from a temperature-control viewpoint.

The temperature setting unit 301 is installed at the controller 300 shown in FIG. 1. On receiving on/off information about a main switch of the X-ray radiography system, this unit 301 supplies information in relation to temperature control to the temperature controller 203 of the FPD 200, at each of the operation and non-operation sates of the X-ray radiography system. On top of it, the temperature setting unit 301 is in charge of setting a target temperature and a target range of temperatures for each of the operation and non-operation states of the system during a series of control routines toward the FPD 200, such as on/off control and signal readout control. This temperature setting can be programmed beforehand or done from the console 400 by hands.

In the present embodiment, it is necessary that the X-ray radiography system be powered during its operation state, because the FPD 200 must be maintained at a predetermined proper temperature state. In order to accomplish this power supply, the FPD power supply 206 is dependent of the main power line of the X-ray radiography system. Therefore turning on or off the main switch of the system is irrelevant to the power to the FPD 200.

Furthermore, in that case that the X-ray radiology system that has been in non-operation is activated, the temperature of the FPD 200 that has been maintained within a temperature range from T2 to T3 is controlled to a target temperature of T1. In this case, if the temperature at which the FPD 200 is maintained during its non-operation state is distant from the new target temperature T1, it takes a fairly long time for the FPD 200 to reach the target temperature T1. A demand of obtaining higher-quality images requires that the FPD 200 of the X-ray radiography system be operated at the target temperature T1.

Figure 10:
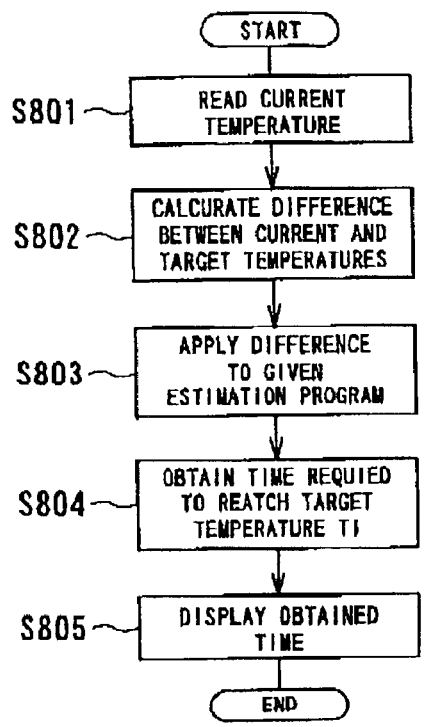
FIG. 10 outlines the processing for estimating a waiting time for completion of the imaging state.

To cope with this condition, the controller 300 receives the output signal of the temperature sensor 202 to detect a current temperature of the FPD 200 (step S801 in FIG. 10). The controller 202 then estimates a period of time from the current temperature to the target temperature T1 at which the X-ray radiography can be done with reliability. The estimation carried out by the controller 300 is based on the known capacity of cooling and heating of the temperature sustainer 204. The controller 300 calculates a difference between the current temperature and the target temperature T1 (step S802). The controller 300 obtains a time required to reach the target temperature T1 by applying the calculated difference to a given estimation program that has been made by considering the difference, the known cooling and heating capacity of the temperature sustainer 204, and the environment temperature (step S804). The estimated time is then displayed on a monitor of the console 400 or the display 600 (step S805).

As a result, an operator is able to confirm the displayed time and wait for the displayed time while the operator can do other work, such as preparation for radiography. Namely, the waiting time can be used usefully.

Figure 11:
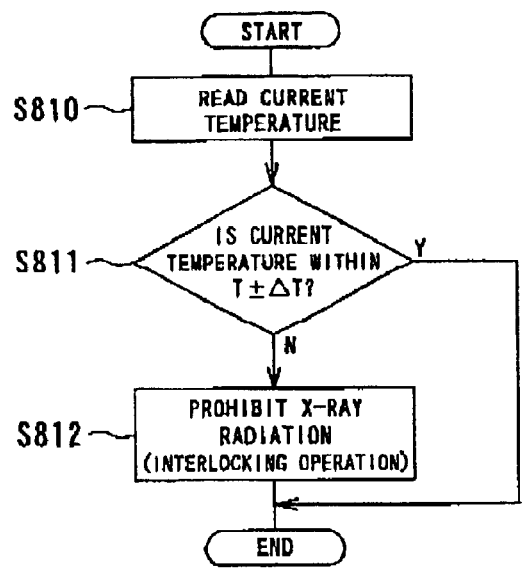
FIG. 11 outlines the processing for an interlocking operation.

Another operation about interlocking the X-ray generator 100 can by provided by the controller 300. The controller receives the output signal of the temperature sensor 202 to detect a current temperature of the FPD 200 (step S810 in FIG. 11). Then, the controller 300 determines if the current temperature is within a range of T1±ΔT or not (step S811). If the current temperature is outside the range of T1±ΔT, the controller forcibly prohibits the X-ray generator 100 from radiating the X-rays any more (step S812).

This interlocking operation avoids X-rays from being radiated by mistake before the temperature of the FPD 200 reaches its rated temperature. Thus, various inconveniences including acquisition of obscure images or increasing X-ray exposure to patient due to re-imaging can be avoided in a steady manner.

It is possible to stop the above interlocking operation even if the above temperature condition based on T1±ΔT is met. For example, if fluoroscopic imaging is in progress in which images with a small amount of deterioration are allowed, that is, preference is given to continuing the fluoroscopic imaging rather than stopping it, the controller 300 is able to stop the above interlocking operation in reply to a command from either programming done beforehand or manual operations done by an operator.

Another Embodiment

Figure 12:
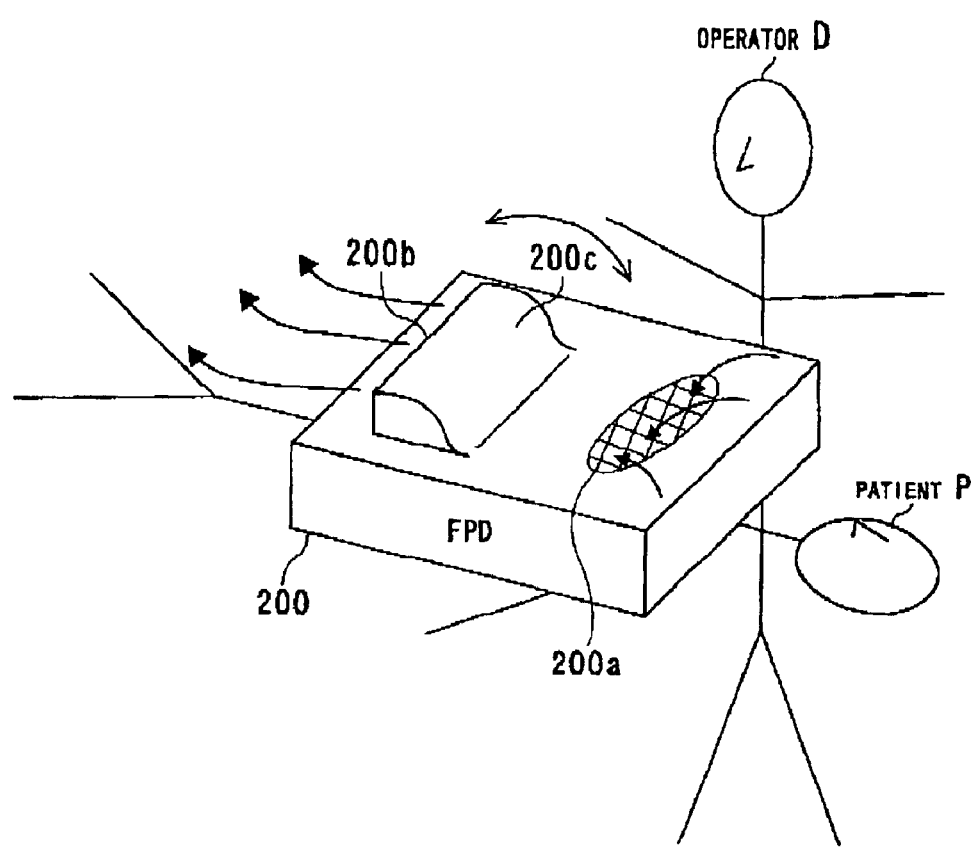
FIG. 12 shows a different use of the medical X-ray radiography system, as another embodiment of the present invention.

With reference to FIG. 12, another embodiment of the X-ray radiography system with the FPD 200 according to the present invention will now be described.

FIG. 12 pictorially shows a condition where an operator D such as a doctor is standing at the side of a patient P laid on a not-shown couch. The FPD 200 installed in the X-ray radiography system is pictorially shown so that it is located above the patient P. X-rays are radiated from the back of the patient P. Within the FPD 200, there are the temperature controller 203, temperature sustainer 204, and other necessary components. An inlet port 200a is formed at a certain position of the FPD 200, which is near to the patient's head. An exhaust port 200b is formed at a position of the FPD 200, which is opposite to the inlet port 200a. Further, the exhaust port 200b is provided with a hood 200c.

In response to the operation of the fan 205 not shown in FIG. 12, the air is taken into the FPD 200 through the inlet port 200a, and circulated through the layered spaces 201e and other passages (shown in FIG. 3). During the circulation, the wind is subject to the heat exchanges with the radiator of the Peltier element contained in the temperature sustainer 204. The wind is finally exhausted outside the FPD 200 through the exhaust port 200b to the hood 200c. The airflow is controlled by the hood 200c so that the exhausted air is directed toward the patient's feet, thereby avoiding the patient P and operator D from being exposed to the heated or cooled wind. That is, it is prevented that the patient P and operator D have unpleasant feelings. Further, such wind does not become an obstacle to the operator's work, thus contributing to an increased efficiency of the operator's work.

As an alternative, the hood 200c can be configured such that it is rotatable to change its exhausting directions. In this case, the exhausting directions can be changed according to positions of one or more operators. The inlet port 200b can also be provided with such a hood or a hood rotatable to change a direction of the inlet port.

Although the description above contains many specificities, these should not be construed as limiting the scope of the invention but as merely providing illustrations of some of the presently preferred embodiments of the present invention. Thus the scope of the present invention should be determined by the appended claims. For example, the FPD that has been described as being the direct conversion type can be reduced into practice by employing the indirect conversion type. In addition, the X-ray radiography system is not limited to the medical X-ray radiography system, as described above. An industrial X-ray inspector, such as a non-destructive examination system can be practiced according to the present invention.

What is claimed is:

1. A radiation detector comprising:
   a detection board on which a plurality of detection elements configured to detect a radiation are two-dimensionally disposed in a matrix and including circuits configured to collect signals from the detection elements;
   a control unit configured to control a temperature of the detection board so that the detection board is held in a predetermined temperature state; and
   a casing enclosing the detection board, including both an inlet port and an exhaust port through which air flows in and out, and including a hood attached to at least one of the exhaust port and formed to change a direction of the air flowing through at least one of the exhaust port and the inlet port.

2. The radiation detector according to claim 1, wherein the predetermined temperature state is defined as a predetermined range of the temperature.

3. The radiation detector according to claim 2, wherein the predetermined range of the temperature is a range defined by either an upper temperature limit or a lower temperature limit.

4. The radiation detector according to claim 1, wherein the control unit includes:

a sensor configured to sense the temperature of the detection board;

a cooling/heating member configured to selectively cool/heat the detection board; and a controller configured to control the temperature of the detection board based on both of the temperature sensed by the sensor and information indicative of the predetermined temperature state.

5. The radiation detector according to claim 4, wherein the cooling/heating member is composed of a Peltier element configured to generate or absorb heat and a fan unit configured to circulate air around the detection board so as to undergo heat exchanges at the Peltier element.

6. The radiation detector according to claim 4, wherein the controller includes:

means for determining whether or not the temperature of the detection board sensed by the sensor is beyond a predetermined temperature limit; and means for forcibly making the cooling/heating member stop cooling/heating the detection board in cases in which the means for determining determines that the temperature of the detection board is beyond the predetermined temperature limit.

7. The radiation detector according to claim 1, wherein the detection board includes:

a first substrate on which the plurality of detection elements are disposed two-dimensionally in the matrix;

a second substrate on which the circuits configured to collect the signals from the detection elements are disposed; and a partition plate placed between the first and second substrates to partition a space between the first and second substrates.

8. The radiation detector according to claim 7, wherein the partition plate is placed so that a layer-like space is left on both sides of the partition plate, both sides facing the first and second substrates.

9. The radiation detector according to claim 1, wherein the hood is configured to be rotatable to change the direction of the air flowing through at least one of the exhaust port and the inlet port.

10. The radiation detector according to claim 1, wherein the hood is attached to the exhaust port and configured to be rotatable to change direction of the air flowing through the exhaust port.

11. A radiography system comprising:

a radiation detector comprising:

a detection board on which a plurality of detection elements configured to detect a radiation are two-dimensionally disposed in a matrix and including circuits configured to collect signals from the detection elements, a control unit configured to control a temperature of the detection board so that the detection board is held in a predetermined temperature state of a first temperature state defined by a temperature value directed to the radiography system in operation and a second temperature state defined by a temperature range directed to the radiography system in non-operation; and a specification unit configured to selectively specify information indicative of either the first temperature state or the second temperature state in response to information indicative of an operation/non-operation state of the radiography system, wherein the control unit includes:

a sensor configured to sense a temperature of the detection board;

a cooling/heating member configured to selectively cool/heat the detection board;

a controller configured to control the temperature of the detection board based on the temperature sensed by the sensor and information indicative of the predetermined temperature state; and means for estimating a period of time until the temperature of the detection board reaches, from the temperature sensed by the sensor, a lower limit of the temperature range defining the second temperature state.

12. The radiography system according to claim 11, wherein the temperature range defining the second temperature state has a lower limit and an upper limit, the lower limit being lower than the temperature value defining the first temperature state.

13. The radiography system according to claim 11, wherein the temperature range defining the second temperature state has a lower limit and an upper limit, the upper limit being equal to or less than the temperature value defining the first temperature state.

14. The radiography system according to claim 11, further comprising:

means for determining whether or not the temperature of the detection board sensed by the sensor is beyond a predetermined temperature limit; and means for forcibly prohibiting generation of the radiations in cases in which the means for determining that the temperature of the detection board is beyond the predetermined temperature limit.

15. The radiography system according to claim 11, further comprising:

means for displaying information about the period of time estimated by the estimating means.

* * * * *